July 28, 1959 R. ADELL 2,897,001
ORNAMENTAL AND PROTECTIVE MOLDING FOR AUTOMOBILE DOOR EDGES
Filed Dec. 31, 1957 2 Sheets-Sheet 1

INVENTOR.
ROBERT ADELL
BY
ATTORNEY

July 28, 1959 R. ADELL 2,897,001
ORNAMENTAL AND PROTECTIVE MOLDING FOR AUTOMOBILE DOOR EDGES
Filed Dec. 31, 1957 2 Sheets-Sheet 2

INVENTOR.
ROBERT ADELL
BY
ATTORNEY

United States Patent Office 2,897,001
Patented July 28, 1959

2,897,001

ORNAMENTAL AND PROTECTIVE MOLDING FOR AUTOMOBILE DOOR EDGES

Robert Adell, Detroit, Mich.

Application December 31, 1957, Serial No. 706,320

1 Claim. (Cl. 296—44)

This invention relates to motor vehicles and more particularly to such vehicles in which the trailing edges of the swinging closures thereof, such as doors, are protected by ornamental and protective molding.

Provision of protective and ornamental molding on the trailing edges of motor vehicle doors, such as disclosed in my issued patents and pending applications, while being of recognized advantage and value, nevertheless, presents a number of serious problems. One of such problems is found in fitting the molding to the trailing edges of doors in which the trailing edge does not have uniform thickness, such as resulting from the provision on the outer surface of the door of various surface moldings or ridges or grooves extending to the very edge of the door. It has been attempted in the past to bend up the ends of such moldings in order that the narrow ornamental and protective molding provided on the trailing edge of the door could be slipped under the ends of such surface moldings and thus appear as continuous molding and possess sufficient mechanical strength to remain in place on the trailing edge of the door in spite of jarring received when doors are slammed shut or due to other causes encountered in operation of the vehicle. It has been found, however, that such expedient possesses a number of serious disadvantages. Because of the curvature of the cross section of the edge molding, it tended to push the ends of the surface molding up showing unsightly gaps greatly detracting from the general appearance of the motor vehicle. On the other hand, termination of surface molding short of reaching the trailing edge may cause an undesirable change in the artistic appearance of the body and is objectionable for that reason. In some cases, particularly when the edge protective molding had to be installed in the field, raising the ends of the surface molding with screw drivers often resulted in their attaching clips to be pulled out from the door cover sheet and bent at the outer surface of the door when attempts were made to slam the molding back into place. With such doors unsightly fitting of the loosened molding was clearly apparent and even caused rattling. Elimination of such a condition often required complete removal and reinstallation of the entire surface molding.

Attempts have also been made to install edge protective and ornamental moldings only between such surface molding or ridges. Such expedient proved objectionable since it made it necessary to cut the molding into a large number of short pieces fitting and attaching each one separately. Even a relatively slight movement of one piece would cause the molding to appear as a broken line. In addition, one of the separate pieces falling out detracts from the appearance of the vehicle still further.

One of the objects of the present invention is to provide an improved ornamental and protective molding whereby the above difficulties and disadvantages are overcome and largely elimnated without introducing other problems or increasing the cost involved.

Another object of the present invention is to provide an improved ornamental and protective molding adapted to cover the trailing edge without the necessity of being fitted under the surface molding or being cut into separate pieces for installation between such surface moldings or ridges.

A further object of the present invention is to provide an improved ornamental and protective molding for automobile doors provided with surface moldings or ridges with said ornamental and protective molding covering the trailing edge of the door intermittently but, nevertheless, presenting a unitary construction sufficiently strong mechanically to remain in place and to resist distortion of the longitudinal configuration of the molding.

A further object of the present invention is to provide an improved ornamental and protective molding for trailing edges of automobile doors, which molding covers said edge intermittently and, therefore, provides additional possibilities of improved ornamental design of the vehicle body.

Further objects and advantages of this invention will be apparent from the following description and appended claim, reference being had to the accompanying drawings forming a part of this specification, wherein like reference characters designate corresponding parts in the several views.

Figure 1:
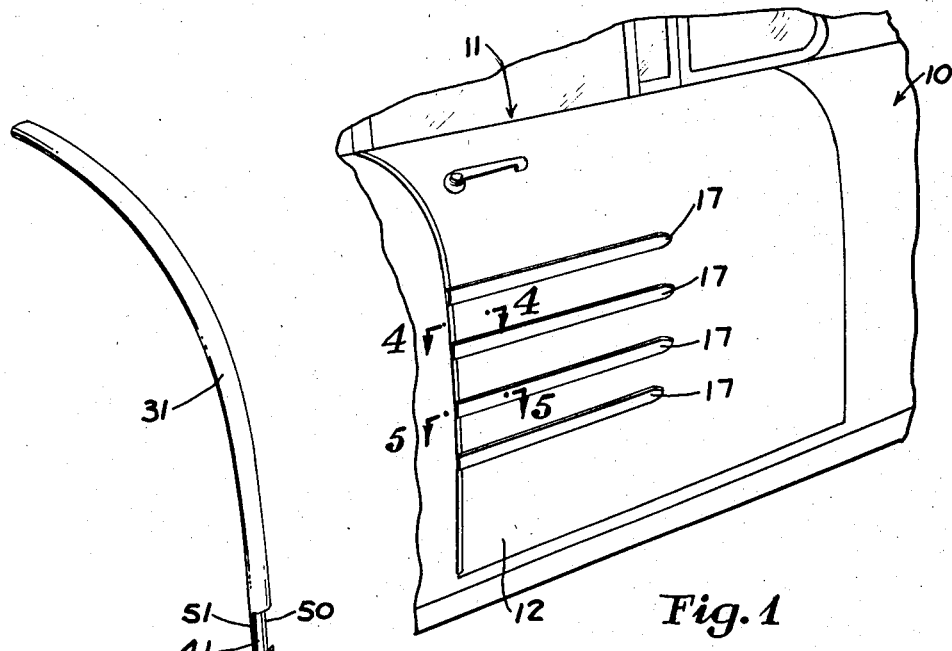
Fig. 1 is a perspective view showing a portion of a motor vehicle body embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I discard the former practice of providing ornamental and protective molding on trailing edges of motor vehicle does in separate pieces in order to avoid surface molding or ridge on the outer surface of the door. I also discard other expedients formerly resorted to for providing ornamental and protective moldings on doors of the above nature.

In accordance with the invention I provide ornamental and protective molding which is a unitary structure and includes a plurality of molding portions, each having a generally U-shape cross section comprising two legs connected by a round portion. Such molding portions are provided only in those places on the trailing edge of the door which do not include surface ridges or moldings. Such molding portions are connected at their inner legs by relatively flat strips connecting such portions and extending on the inner side of the door. For the purposes of strength such flat connecting portions may include bends along both of its longitudinal edges.

The connecting means may be in the form of separate pieces spot welded or otherwise secured to the ornamental molding portions or in the form of a single strip in the form of a very narrow channel. The entire construction may also be in the form of an integral piece with the connecting portions being formed by cutting out portions of the molding that would otherwise be on the outer side of the door. It should be understood that such moldings may be provided both in the curved portions as well as in straight portions of the door edge.

In the drawing there is shown by way of example a portion of an automobile body embodying the present invention. The automobile body illustrated therein and generally indicated by the numeral 10 includes a swinging door 11 having a trailing or back edge provided with ornamental and protective molding. The molding embodying the present invention may be a one-piece or a multiple-piece construction. In either case it is a unitary structure fitted over the trailing edge of the door but covering said edge only in places where no surface moldings or ridges are provided on the outer surface 11 of the door.

Figure 2:
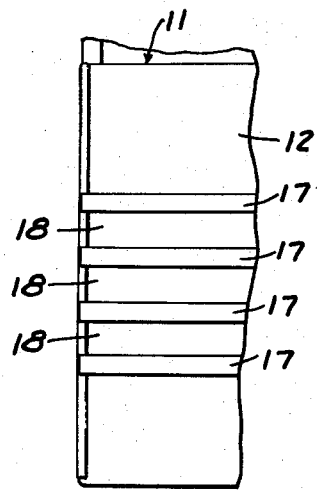
Fig. 2 is a side view in a straight projection of the construction of Fig. 1.

The door includes an outer or cover sheet 12 bent upon itself as indicated at 13 over the edge of the inner door sheet 14; thus the bent over edge of the outer sheet 12 forms, in effect, the trailing edge of the door. On the outer surface of the sheet 12 there is provided a plurality of ridges 17 extending from the trailing edge for any desirable distance forwardly of the door as shown in Figs. 1 and 2, and separated by valleys 18.

The ornamental molding comprises a plurality of portions fully covering the trailing edges in places devoid of surface moldings or ridges from both sides thereof, such as in the valleys 18. Said portions of the molding comprise a strip of material preferably stainless steel of approximately ⅞" wide and bent upon itself substantially along its middle to an elliptical or oval cross section with one end thereof being open. The edges of the molding are bent upon themselves for approximately 1/32" as indicated at 21 and 22. There is thus formed a molding having a cross section including an inner leg 23 and an outer leg 24 connected together by rounded portion 25. The portions of the molding so made embrace the trailing edge, with the inner leg thereof being on the inner side of the door and the outer leg 24 extending over the edge of the door and exposed to view. Such portions of the molding are indicated in the drawings by the numerals 31, 32, 33, 34 and 35.

Instead of being separate pieces installable and removable separately, such portions of my improved molding are connected together by connecting portions 41, 42, 43 and 44. The connecting portions 41, 42, 43 and 44 extend substantially in the plane of the inner leg of the molding and may form a continuation thereof as in the construction illustrated in Figs. 3–5. For the purposes of rigidity the connecting portions have their edges bent upon themselves as indicated at 50 and partly bent as indicated at 51. In the structure illustrated in Figs. 3–5, such a construction is attained by making edges 50 a continuation of the edges 31, and edges 51 a continuation of the part of the connecting portion 25 of the molding portions. Thus, the original form of the molding is utilized to produce such bends or reinforcing means in the connecting portions 41, 42 and 43, eliminating a special operation required where connecting portions are not integral with the edge-covering molding portions.

Figure 7:
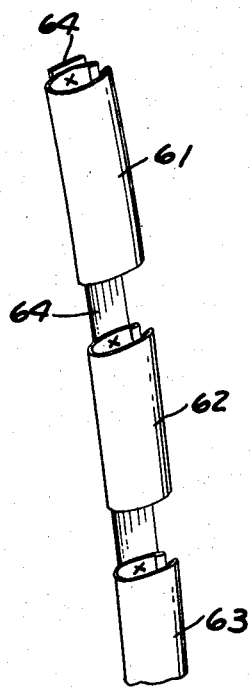
Fig. 7 is a view similar in part to Fig. 3 but showing in perspective an ornamental and protective molding of a modified construction and embodying the present invention.
Figure 6:
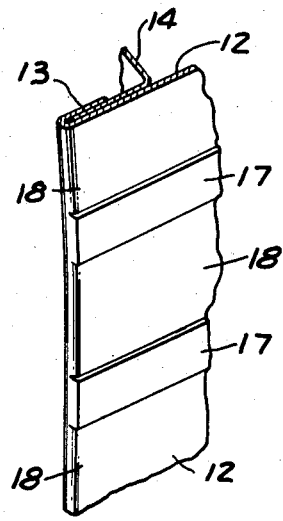
Fig. 6 is a perspective fragmentary view taken on the trailing edge with the ornamental molding being removed.

In the construction of Fig. 7 the individual portions of the molding are indicated by the numerals 61, 62 and 63, and the connecting strip is indicated by the numeral 64. The connecting strip may be spot welded or otherwise secured to the molding portion 61, 62 and 63 to form a unitary structure.

Figure 3:
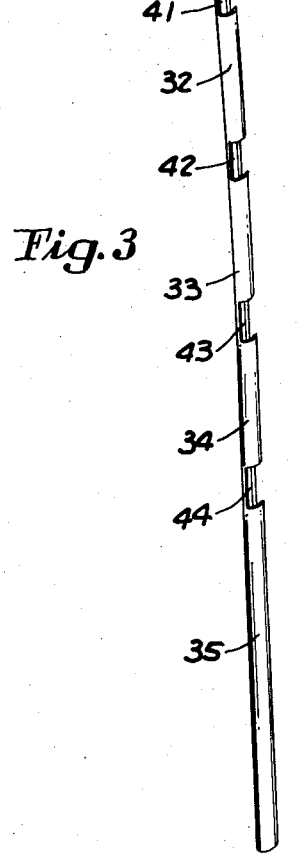
Fig. 3 is a perspective view of the ornamental and edge protective molding used in the construction illustrated in Figs. 1 and 2, with said molding being shown separately.
Figure 4:
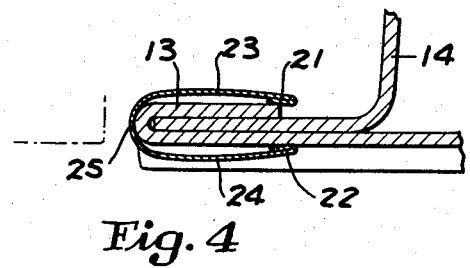
Fig. 4 is a fragmentary sectional view taken in the direction of the arrows on the section plane passing through the section line 4—4 of Fig. 1.
Figure 5:
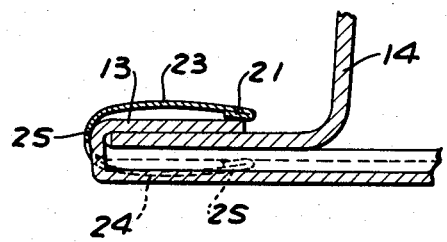
Fig. 5 is a fragmentary sectional view taken in the direction of the arrows on the section plane passing through the section line 5—5 of Fig. 1.

It will now be seen in view of the foregoing that while in the construction of Fig. 7 connecting portions may be in the form of a single strip connecting together all of the edge-covering molding portions, in the construction of Figs. 3–5 the molding is of an integral or one-piece construction and the desired construction is attained by cutting out portions of the molding in the outer leg thereof approximately to the middle of the connecting portion 25 and in such places longitudinally of the molding where surface ridges or surface moldings reach the trailing edge of the door. By virtue of such a construction the entire molding, which appears to the observer as consisting of a large number of pieces, is, in effect, a single piece possessing sufficient rigidity and strength to remain in place under severe operating conditions.

By virtue of the above disclosed construction the objects of the invention listed above and numerous additional advantages are attained.

I claim:

An ornamental and edge protective molding for an automobile door having its outside surface provided with raised ridges extending to the extremity of the trailing edge of the door and resulting in a trailing edge having its thickness vary along its length because of said ridges, said molding comprising an elongated flat strip of metal and a plurality of molding sections of a U shape cross section spot welded to said strip to provide a molding adapted to cover said trailing edge only in those places of the trailing edge which are free from said ridges.

References Cited in the file of this patent

UNITED STATES PATENTS

| | | |
|---|---|---|
| 2,489,072 | Ausubel | Nov. 22, 1949 |
| 2,685,472 | Adell | Aug. 3, 1954 |
| 2,733,097 | Stevens | Jan. 31, 1956 |